United States Patent
Chuang et al.

(10) Patent No.: US 8,178,259 B2
(45) Date of Patent: May 15, 2012

(54) OPTIMIZED GAS DIFFUSION MEDIA TO IMPROVE FUEL CELL PERFORMANCE

(75) Inventors: Po-Ya Abel Chuang, Victor, NY (US); Wenbin Gu, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 314 days.

(21) Appl. No.: 12/702,400

(22) Filed: Feb. 9, 2010

(65) Prior Publication Data

US 2011/0192282 A1 Aug. 11, 2011

(51) Int. Cl.
*H01M 4/02* (2006.01)

(52) U.S. Cl. .................. 429/523; 423/447.1; 423/447.2; 429/483; 429/532; 429/534

(58) Field of Classification Search ............... 423/447.1, 423/447.2; 429/483, 523, 532, 534
See application file for complete search history.

(56) References Cited

U.S. PATENT DOCUMENTS

| | | | | |
|---|---|---|---|---|
| 5,462,799 | A | * | 10/1995 | Kobayashi et al. ........... 428/364 |
| 7,829,230 | B2 | * | 11/2010 | Berning et al. ............... 429/433 |
| 2004/0048141 | A1 | * | 3/2004 | Blank et al. ..................... 429/38 |
| 2006/0204835 | A1 | * | 9/2006 | Kelsey et al. ................... 429/86 |
| 2006/0228606 | A1 | * | 10/2006 | Fiebig et al. .................... 429/32 |
| 2007/0141405 | A1 | * | 6/2007 | Lai et al. ......................... 429/12 |
| 2008/0032182 | A1 | * | 2/2008 | Ren et al. ........................ 429/41 |
| 2010/0028744 | A1 | * | 2/2010 | Wieser et al. ................... 429/30 |
| 2010/0209815 | A1 | * | 8/2010 | Tolmachev .................... 429/483 |
| 2011/0207022 | A1 | * | 8/2011 | Wieser et al. ................. 429/512 |

OTHER PUBLICATIONS

Baker et al., The Use of Limiting Current to Determine Transport Resistance in PEM Fuel Cells, General Motors ECS Transactions 3 (1), 2006, pp. 989-999.

* cited by examiner

*Primary Examiner* — Jason M Greene
*Assistant Examiner* — Anthony Shumate
(74) *Attorney, Agent, or Firm* — Dinsmore & Shohl LLP

(57) ABSTRACT

A gas diffusion media is described. The gas diffusion media comprises a conductive porous substrate; and a microporous layer; wherein a cathode effective transport length is in a range of about 700 to about 1900 μm; wherein an overall thermal resistance is in a range of about 1.8 to about 3.8 $cm^2$-K/W; and wherein a ratio of the cathode effective transport length to an anode effective transport length is greater than about 2.

20 Claims, 1 Drawing Sheet

US 8,178,259 B2

OPTIMIZED GAS DIFFUSION MEDIA TO IMPROVE FUEL CELL PERFORMANCE

FIELD OF THE INVENTION

The present invention relates to generally to fuel cells, and more particularly to improved gas diffusion media and methods of designing them.

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with catalyst layers on both sides. The catalyst coated PEM is positioned between a pair of gas diffusion media layers (DM), and a cathode plate and an anode plate (or bipolar plates (BPP)) are placed outside the gas diffusion media layers. The components are compressed to form the fuel cell.

Therefore, there is a need for improved diffusion media.

SUMMARY OF THE INVENTION

Optimized requirements for anode and cathode diffusion media to achieve improved performance under both wet and dry conditions are described.

In one embodiment, a gas diffusion media is described. The gas diffusion media comprises a conductive porous substrate; and a microporous layer; wherein a cathode effective transport length is in a range of about 700 to 1900 μm; wherein an overall thermal resistance is in a range of about 1.8 to about 3.8 cm$^2$-K/W; and wherein a ratio of the cathode effective transport length to an anode effective transport length is greater than about 2.

DETAILED DESCRIPTION OF THE INVENTION

Figure 1:
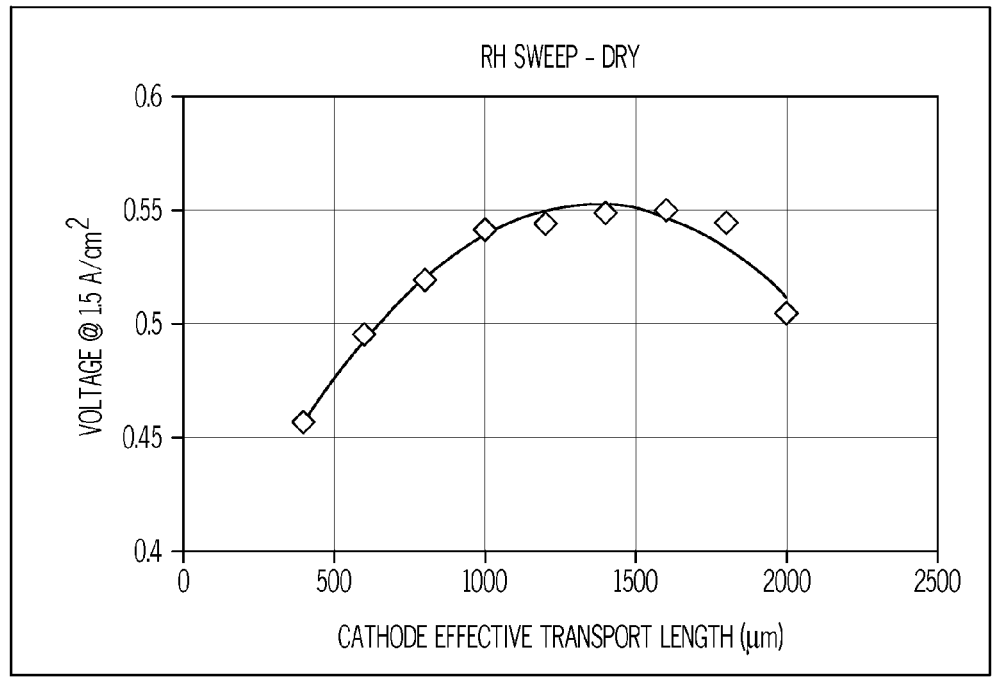
FIG. 1 is a graph showing the cathode effective length as a function of voltage.

The optimized conditions for anode and cathode diffusion media to obtain improved performance under both wet and dry conditions are presented. The optimized diffusion media has the potential to improve fuel cell performance with low loaded electrodes because of its high sensitivity to liquid water. It can also reduce sensitivity to relative humidity (RH).

Under dry conditions, membrane temperature and cathode effective transport length are two parameters which affect fuel cell performance. By effective transport length (ETL), we mean (D/D$_{effective}$) times thickness. D/D$_{effective}$ is difficult to measure when the pore size is small. A limiting current method was developed to measure D/D$_{effective}$ when the pore size is above micron size. The limiting current method is described in D. Baker, C. Wieser, K. C. Neyerlin, and M. W. Murphy, "The use of limiting current to determine transport resistance in PEM fuel cells," ECS Transactions, 3 (1) 989 (2006)., which is incorporated herein by reference. Limiting current measurements are used to derive estimates of oxygen transport resistance through the cathode diffusion medium/micro-porous layer (DM/MPL) of a fuel cell. Straight-channel flow fields of 5 cm$^2$ were used on the cathode and anode side of the cell. The land and channel width was 0.5 mm. Constant flow rates were used, corresponding to stoichiometries of 12/31 at 2 A/cm$^2$ on the anode/cathode for 100% hydrogen/21% oxygen. The high stoichiometries and the small pressure drop (less than 4 kPa) in the flow field ensure that the partial pressures of the various gas species remain close to constant from inlet to outlet. The cell voltage was decreased from 0.6 V to 0 V in 30 mV steps with a dwell time of 2 min. at each voltage and a data-recording interval of 20 s. Longer dwell times produced no change in the measured limiting currents. In the microporous layer (MPL), the pore size is as small as 30-50 nm. As a result, it is difficult to define D/D$_{effective}$ in the MPL.

Under wet conditions, the key factors that affect cell performance are directly related to effectively removing water from the cathode electrode to the channels. These factors include but are not limited to, membrane temperature, diffusion media pore structure and hydrophobicity, diffusion media diffusivity under dry and wet conditions, etc.

The diffusion media should meet one or more of the following conditions (or two or more, or three or more, or four or more, or five or more, or six or more). Not all conditions need to be met by a particular diffusion media.

The first two conditions are generally related to operation under dry conditions, while the next four generally relate to operation under wet conditions.

One condition is that the cathode ETL is in a range of about 700-1900 μm. This is the overall cathode ETL (both carbon fiber substrate and MPL).

Another condition is that the overall thermal resistance can be in the range of about 1.8 to about 3.8 cm$^2$-K/W. The overall thermal resistance is defined as the anode thermal resistance times the cathode thermal resistance divided by the sum of anode thermal resistance and cathode thermal resistance [(R$_{anode}$×R$_{cathode}$)/(R$_{anode}$+R$_{cathode}$)].

The third condition is that the ratio of the cathode ETL to the anode ETL can be greater than 2.

The fourth condition is that the ratio of the anode thermal resistance to the cathode thermal resistance can be greater than 2.

The fifth condition is that the ratio of the thermal conductivity of the carbon fiber substrate to the thermal conductivity of the MPL can be greater than 3.

The sixth condition is that the ETL of the cathode MPL can be less than about 100 μm.

The seventh condition is that the electrical resistance can be less than about 20 mΩ-cm$^2$. This is the through plane electrical resistance measured at 2.0 MPa, 2 layers of DM (anode and cathode) with gold platen.

A single layer of a Toray060 diffusion media without the MPL (available from Toray Corp., Tokyo, Japan) would have a ETL of about 600 to 800 μm, a thermal resistance in the range of about 2 to 2.5 cm$^2$-K/W at 2.2 MPa, single layer with graphite platen, and an electrical resistance of about 10 mΩ-cm$^2$ at 2.0 MPa, single layer with gold platen.

The dry performance of the fuel cell can be optimized by adjusting the cathode ETL. FIG. 1 is a graph showing the cell voltage at 1.5 A/cm$^2$ as a function of cathode EFL. The data were obtained from fuel cell model when anode inlet RH and pressure were 35% and 180 kpa, cathode inlet RH and pressure were 20% and 160 kpa, and the average cell temperature was at 75° C. It is typically in a range of about 700 to about 1900 μm, or about in a range of about 900 to about 1700 μm, or about in a range of about 1100 to about 1500 μm, or a range of about 1000 to about 1600 μm.

The ETL can be changed by changing the thickness of the material (either carbon fiber substrate, or MPL, or both). ETL can also be changed by changing $D/D_{effective}$. $D/D_{effective}$ is a function of porosity, tortuosity, and pore size, and it can be changed by changing one or more of these properties. Typically, increasing porosity is the easiest way to decrease $D/D_{effective}$.

Figure 2:
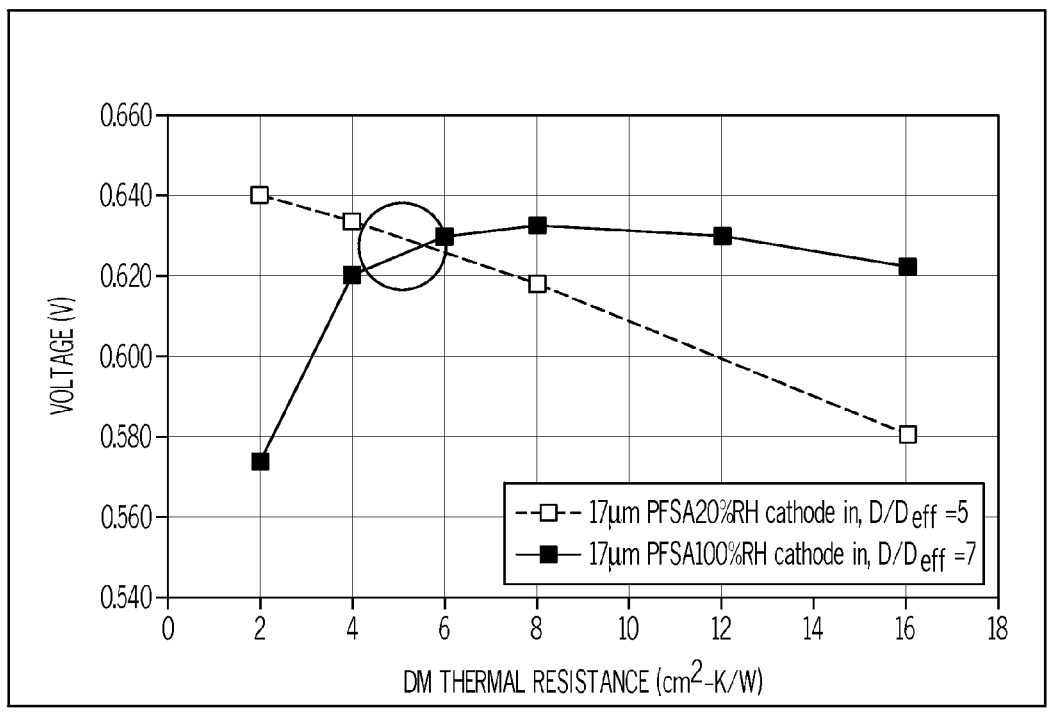
FIG. 2 is a graph showing the diffusion media thermal resistance as a function of voltage.

The wet and dry performance can be balanced by adjusting the thermal resistance. FIG. 2 shows the cell voltage as a function of thermal resistance. The cell voltage was measured under the following conditions: $H_2$/air at the stoichiometry of 2, counter-flow, 50% inlet RH on the anode side, 50 kPag inlet pressure, and the average cell temperature was at 75° C. The two lines plotted on FIG. 2 represent 20% inlet RH (dry condition) and 100% inlet RH (wet condition) on the cathode side. The $D/D_{effective}$ used in the model is 5 and 7 under dry and wet conditions, respectively. The graph shows that the optimal resistance is about 5.6 $cm^2$-K/W. Therefore, the optimal overall thermal resistance should be the thermal resistance of the anode times the thermal resistance of the cathode divided by the sum of the thermal resistance of the anode and the thermal resistance of the cathode [$(R_{anode} \times R_{cathode})/(R_{anode}+R_{cathode})$ or $(5.6 \times 5.6)/(5.6+5.6)=2.8$ $cm^2$-K/W]. The range of optimal resistance is generally between about 3.6 and 7.6 $cm^2$-K/W, or between about 4.0 and 7.2 $cm^2$-K/W, or between about 4.4 and 6.8 $cm^2$-K/W, or between about 4.8 and 6.4 $cm^2$-K/W. Consequently, the overall thermal resistance is generally in the range of about 1.8 to about 3.8 $cm^2$-K/W, or about 2.0 to about 3.6 $cm^2$-K/W, or about 2.2 to about 3.4 $cm^2$-K/W, or about 2.4 to about 3.2-$cm^2$-K/W.

The thermal resistance and thermal conductivity can be measured with a thermal analyzer by placing a piece of diffusion media between two graphite plates and compressed to 2.2 MPa. It may be difficult to measure thermal resistance if the layer is very thin and the contact resistance is relatively high, such as a MPL. However, the thermal resistance specified above refers to the contact resistance and the bulk resistance of the whole layer including the substrate and the MPL. The thermal properties can be changed by changing the materials and the porosity, for example. Thermal conductivity can be reduced by increasing the porosity of the material.

Suitable conductive porous substrates include, but are not limited to, carbon fiber substrates, non-conductive fiber substrates with conductive coatings, metal forms, non-conductive forms with conductive coatings, or combinations thereof.

The conductive porous substrate and the microporous layer are typically hydrophobic. One or both could be locally hydrophobic and locally hydrophilic, if desired.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A gas diffusion media comprising:
    a conductive porous substrate; and
    a microporous layer;
    wherein a cathode effective transport length is in a range of about 700 to about 1900 μm;
    wherein an overall thermal resistance is in a range of about 1.8 to about 3.8 $cm^2$-K/W; and
    wherein a ratio of the cathode effective transport length to an anode effective transport length is greater than about 2.

2. The gas diffusion media of claim 1 wherein a ratio of an anode thermal resistance to a cathode thermal resistance is greater than about 2.

3. The gas diffusion media of claim 1 wherein a ratio of a thermal conductivity of the conductive porous substrate to a thermal conductivity of the microporous layer is greater than about 3.

4. The gas diffusion media of claim 1 wherein an effective transport length for a cathode microporous layer is less than about 100 μm.

5. The gas diffusion media of claim 1 wherein a combined electrical resistance for an anode or a cathode is less than about 20 mΩ-$cm^2$.

6. The gas diffusion media of claim 1 wherein the conductive porous substrate is a non-woven carbon fiber substrate.

7. The gas diffusion media of claim 1 wherein the cathode effective transport length is in a range of about 1000 to about 1600 μm.

8. The gas diffusion media of claim 1 wherein an overall thermal resistance is in a range of about 2.2 to about 3.4 $cm^2$-K/W.

9. The gas diffusion media of claim 1 wherein a thickness of the substrate for the cathode is less than 150 μm at 2.0 Mpa.

10. The gas diffusion media of claim 1 wherein a thickness of the microporous layer is in a range of about 10 μm to about 50 μm at 2.0 MPa.

11. The gas diffusion media of claim 1 wherein the conductive porous substrate and the microporous layer are hydrophobic.

12. A gas diffusion media comprising:
    a conductive porous substrate; and
    a microporous layer;
    wherein a cathode effective transport length is in a range of about 700 to about 1900 μm;
    wherein an overall thermal resistance is in a range of about 1.8 to about 3.8 $cm^2$-K/W;
    wherein a ratio of the cathode effective transport length to an anode effective transport length is greater than about 2;

wherein a ratio of an anode thermal resistance to a cathode thermal resistance is greater than about 2; and wherein a ratio of a thermal conductivity of the conductive porous substrate to a thermal conductivity of the microporous layer is greater than about 3.

13. The gas diffusion media of claim 12 wherein an effective transport length for a cathode microporous layer is less than about 100 μm.

14. The gas diffusion media of claim 12 wherein a combined electrical resistance for an anode or a cathode is less than about 20 mΩ-cm$^2$.

15. The gas diffusion media of claim 12 wherein the substrate is a non-woven carbon fiber substrate.

16. The gas diffusion media of claim 12 wherein the cathode effective transport length is in a range of about 1000 to about 1600 μm.

17. The gas diffusion media of claim 12 wherein the overall thermal resistance is in a range of about 2.2 to about 3.4 cm$^2$-K/W.

18. The gas diffusion media of claim 12 wherein a thickness of the conductive porous substrate for the cathode is less than 150 μm at 2.0 MPa.

19. The gas diffusion media of claim 12 wherein a thickness of the microporous layer is in a range of about 10 μm to about 50 μm at 2.0 MPa.

20. The gas diffusion media of claim 12 wherein the conductive porous substrate and the microporous layer are hydrophobic.

* * * * *